US012657103B2

(12) United States Patent
Subber et al.

(10) Patent No.: US 12,657,103 B2
(45) Date of Patent: Jun. 16, 2026

(54) SYSTEMS, APPARATUSES, METHODS, AND COMPUTER PROGRAM PRODUCTS FOR DETERMINING A SERVICES RESOURCE CONSUMPTION

(71) Applicant: HONEYWELL INTERNATIONAL INC., Charlotte, NC (US)

(72) Inventors: Waad Subber, Niskayuna, NY (US); Lakshminarayana Paila, Knoxville, TN (US); Judith Fainor, Doylestown, PA (US); Ankit Singh, Apex, NC (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 376 days.

(21) Appl. No.: 18/332,437

(22) Filed: Jun. 9, 2023

(65) Prior Publication Data

US 2024/0411657 A1     Dec. 12, 2024

(51) Int. Cl.
*G06F 11/34* (2006.01)
(52) U.S. Cl.
CPC ................................. *G06F 11/3409* (2013.01)
(58) Field of Classification Search
CPC .. G06F 11/3409; G06F 11/3447; G06N 20/00
See application file for complete search history.

(56) References Cited

U.S. PATENT DOCUMENTS

| | | | |
|---|---|---|---|
| 11,194,688 B1 * | 12/2021 | Featonby | .............. G06F 11/004 |
| 2021/0111968 A1 * | 4/2021 | Clarke | .................... H04L 67/51 |
| 2022/0237035 A1 * | 7/2022 | Banerjee | .............. G06F 16/258 |
| 2024/0184681 A1 * | 6/2024 | Podolski | ............ G06F 11/3409 |
| 2024/0303174 A1 * | 9/2024 | Sethi | ................... G06F 11/3409 |

* cited by examiner

*Primary Examiner* — Manuel L Barbee
(74) *Attorney, Agent, or Firm* — ALSTON & BIRD LLP

(57) ABSTRACT

Systems, apparatuses, methods, and computer program products are provided. For example, a computer-implemented method provided herein may include receiving a system architecture. In some embodiments, the system architecture is representative of a plurality of services and a plurality of services metadata datasets. In some embodiments, the computer-implemented method may include parsing the system architecture to generate a plurality of services resource consumption representation requests. In some embodiments, the computer-implemented method may include processing the plurality of services resource consumption representation requests using a plurality of services resource consumption utilization tools. In some embodiments, the computer-implemented method may include receiving a plurality of services resource consumption responses from the plurality of services resource consumption utilization tools. In some embodiments, the computer-implemented method may include determining a services resource consumption based at least in part on the plurality of services resource consumption responses.

18 Claims, 6 Drawing Sheets

100

SYSTEM ARCHITECTURE GENERATION TOOL 170

160

USER DEVICES

NETWORK 130

DATABASES 150

SERVICES OPTIMIZATION SYSTEM 140

SERVICES RESOURCE CONSUMPTION UTILIZATION TOOL 110

SERVICES RESOURCE CONSUMPTION UTILIZATION TOOL 110

Architecture Modeling Interface 400

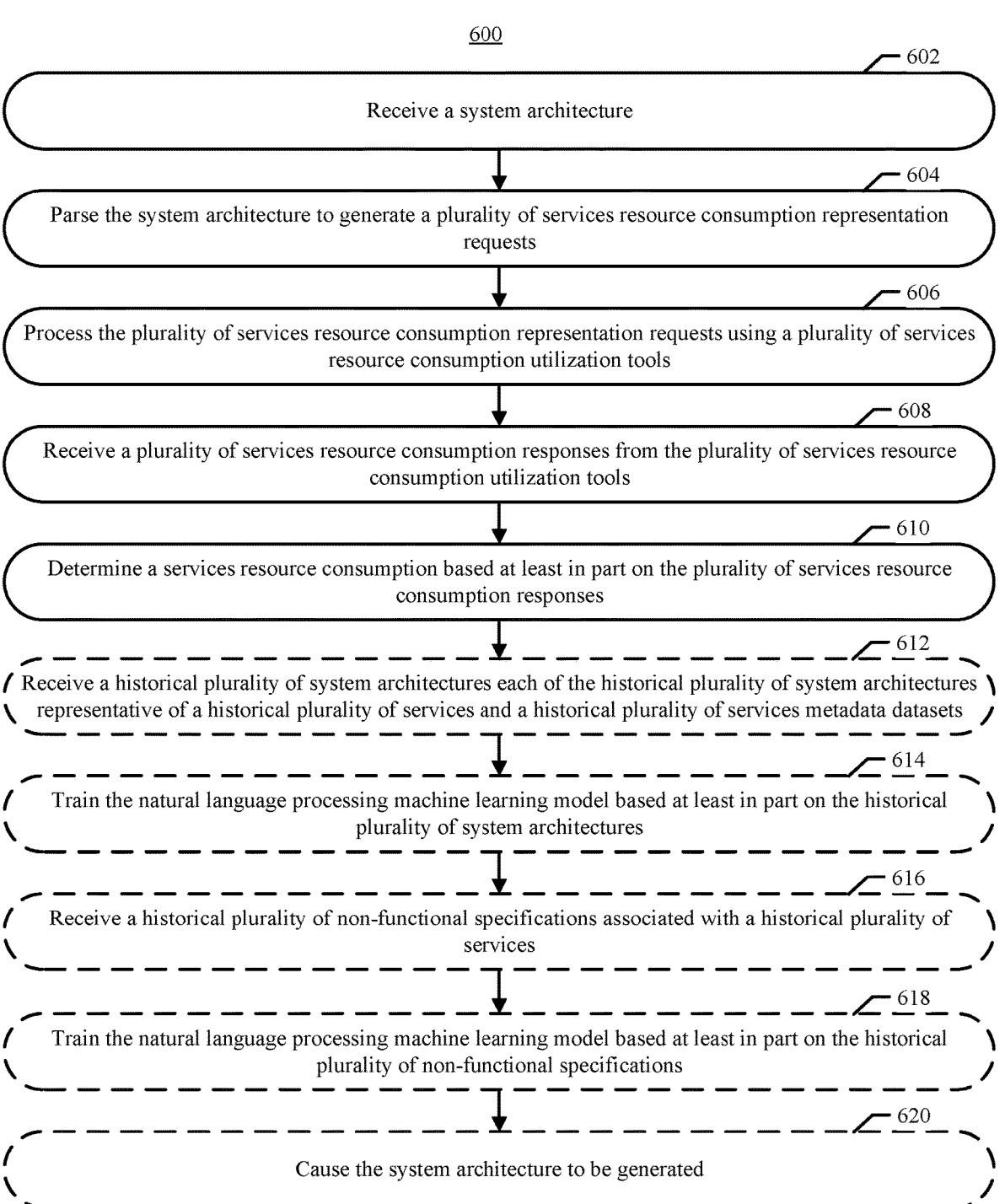

600

602
Receive a system architecture

604
Parse the system architecture to generate a plurality of services resource consumption representation requests 606
Process the plurality of services resource consumption representation requests using a plurality of services resource consumption utilization tools 608
Receive a plurality of services resource consumption responses from the plurality of services resource consumption utilization tools 610
Determine a services resource consumption based at least in part on the plurality of services resource consumption responses 612
Receive a historical plurality of system architectures each of the historical plurality of system architectures representative of a historical plurality of services and a historical plurality of services metadata datasets 614
Train the natural language processing machine learning model based at least in part on the historical plurality of system architectures 616
Receive a historical plurality of non-functional specifications associated with a historical plurality of services 618
Train the natural language processing machine learning model based at least in part on the historical plurality of non-functional specifications 620
Cause the system architecture to be generated

FIG. 6

SYSTEMS, APPARATUSES, METHODS, AND COMPUTER PROGRAM PRODUCTS FOR DETERMINING A SERVICES RESOURCE CONSUMPTION

TECHNOLOGICAL FIELD

Embodiments of the present disclosure relate generally to systems, apparatuses, methods, and computer program products for determining a services resource consumption.

BACKGROUND

Applicant has identified many technical challenges and difficulties associated with systems, apparatuses, methods, and computer program products for determining a services resource consumption. Through applied effort, ingenuity, and innovation, Applicant has solved problems related to systems, apparatuses, methods, and computer program products for determining a services resource consumption by developing solutions embodied in the present disclosure, which are described in detail below.

BRIEF SUMMARY

Various embodiments described herein relate to systems, apparatuses, methods, and computer program products for determining a services resource consumption.

In accordance with one aspect of the disclosure, a computer-implemented method is provided. In some embodiments, the computer-implemented method may include receiving a system architecture. In some embodiments, the system architecture is representative of a plurality of services and a plurality of services metadata datasets. In some embodiments, each of the plurality of services is associated with one of the plurality of services metadata datasets. In some embodiments, the computer-implemented method may include parsing the system architecture to generate a plurality of services resource consumption representation requests. In some embodiments, the computer-implemented method may include processing the plurality of services resource consumption representation requests using a plurality of services resource consumption utilization tools. In some embodiments, the computer-implemented method may include receiving a plurality of services resource consumption responses from the plurality of services resource consumption utilization tools. In some embodiments, the computer-implemented method may include determining a services resource consumption based at least in part on the plurality of services resource consumption responses.

In some embodiments, parsing the system architecture to generate the plurality of services resource consumption representation requests is performed by a natural language processing machine learning model.

In some embodiments, the computer-implemented method may include receiving a historical plurality of system architectures each of the historical plurality of system architectures representative of a historical plurality of services and a historical plurality of services metadata datasets. In some embodiments, each of the historical plurality of services is associated with one of the historical plurality of services metadata datasets. In some embodiments, the computer-implemented method may include training the natural language processing machine learning model based at least in part on the historical plurality of system architectures.

In some embodiments, at least a portion of the plurality of services metadata datasets is generated by a natural language processing machine learning model parsing a plurality of non-functional specifications associated with the plurality of services.

In some embodiments, the computer-implemented method may include receiving a historical plurality of non-functional specifications associated with a historical plurality of services.

In some embodiments, the computer-implemented method may include training the natural language processing machine learning model based at least in part on the historical plurality of non-functional specifications.

In some embodiments, a first service of the plurality of services is associated with a first services resource consumption utilization tool of the plurality of services resource consumption utilization tools and a second service of the plurality of services is associated with a second services resource consumption utilization tool of the plurality of services resource consumption utilization tools.

In some embodiments, each of the plurality of services resource consumption representation requests are associated with one of a plurality of configurations.

In some embodiments, each of the plurality of services metadata datasets comprises one or more of a computing resource consumption metadata, services type metadata, usage metadata, user type metadata, regional deployment infrastructure metadata, or user identification metadata.

In some embodiments, the system architecture is representative of a computing system comprising a plurality of services and a plurality of connections between the plurality of services.

In some embodiments, the computer-implemented method may include causing the system architecture to be generated. In some embodiments, causing the system architecture to be generated includes causing an architecture component interface to be displayed on a user interface. In some embodiments, the architecture component interface comprises a plurality of architecture components each representative of the plurality of services. In some embodiments, causing the system architecture to be generated includes causing an architecture modeling interface to be displayed on the user interface. In some embodiments, causing the system architecture to be generated includes generating a plurality of architecture component requests. In some embodiments, each of the plurality of architecture component requests comprises an indication of a selection of one of the plurality of architecture components corresponding to one of the plurality of services and one of the plurality of services metadata datasets. In some embodiments, causing the system architecture to be generated includes providing the plurality of architecture component requests to a system architecture generation tool. In some embodiments, causing the system architecture to be generated includes causing an updated architecture modeling interface to be displayed on the user interface based at least in part on the plurality of architecture component requests. In some embodiments, the updated architecture modeling interface comprises the system architecture.

In accordance with another aspect of the disclosure, an apparatus is provided. In some embodiments, the apparatus may include at least one processor and at least one memory coupled to the at least one processor. In some embodiments, the at least one processor is configured to receive a system architecture. In some embodiments, the system architecture is representative of a plurality of services and a plurality of services metadata datasets. In some embodiments, each of the plurality of services is associated with one of the plurality of services metadata datasets. In some embodiments, the at least one processor is configured to parse the system architecture to generate a plurality of services resource consumption representation requests. In some embodiments, the at least one processor is configured to process the plurality of services resource consumption representation requests using a plurality of services resource consumption utilization tools. In some embodiments, the at least one processor is configured to receive a plurality of services resource consumption responses from the plurality of services resource consumption utilization tools. In some embodiments, the at least one processor is configured to determine a services resource consumption based at least in part on the plurality of services resource consumption responses.

In some embodiments, parsing the system architecture to generate the plurality of services resource consumption representation requests is performed by a natural language processing machine learning model.

In some embodiments, the at least one processor is configured to receive a historical plurality of system architectures each of the historical plurality of system architectures representative of a historical plurality of services and a historical plurality of services metadata datasets. In some embodiments, each of the historical plurality of services is associated with one of the historical plurality of services metadata datasets. In some embodiments, the at least one processor is configured to train the natural language processing machine learning model based at least in part on the historical plurality of system architectures.

In some embodiments, at least a portion of the plurality of services metadata datasets is generated by a natural language processing machine learning model parsing a plurality of non-functional specifications associated with the plurality of services.

In some embodiments, the at least one processor is configured to receive a historical plurality of non-functional specifications associated with a historical plurality of services.

In some embodiments, the at least one processor is configured to train the natural language processing machine learning model based at least in part on the historical plurality of non-functional specifications.

In some embodiments, a first service of the plurality of services is associated with a first services resource consumption utilization tool of the plurality of services resource consumption utilization tools and a second service of the plurality of services is associated with a second services resource consumption utilization tool of the plurality of services resource consumption utilization tools.

In some embodiments, each of the plurality of services resource consumption representation requests are associated with one of a plurality of configurations.

In some embodiments, each of the plurality of services metadata datasets comprises one or more of a computing resource consumption metadata, services type metadata, usage metadata, user type metadata, regional deployment infrastructure metadata, or user identification metadata.

In some embodiments, the system architecture is representative of a computing system comprising a plurality of services and a plurality of connections between the plurality of services.

In some embodiments, the at least one processor is configured to cause the system architecture to be generated. In some embodiments, causing the system architecture to be generated includes causing an architecture component interface to be displayed on a user interface. In some embodiments, the architecture component interface comprises a plurality of architecture components each representative of the plurality of services. In some embodiments, causing the system architecture to be generated includes causing an architecture modeling interface to be displayed on the user interface. In some embodiments, causing the system architecture to be generated includes generating a plurality of architecture component requests. In some embodiments, each of the plurality of architecture component requests comprises an indication of a selection of one of the plurality of architecture components corresponding to one of the plurality of services and one of the plurality of services metadata datasets. In some embodiments, causing the system architecture to be generated includes providing the plurality of architecture component requests to a system architecture generation tool. In some embodiments, causing the system architecture to be generated includes causing an updated architecture modeling interface to be displayed on the user interface based at least in part on the plurality of architecture component requests. In some embodiments, the updated architecture modeling interface comprises the system architecture.

In accordance with another aspect of the disclosure, a non-transitory computer-readable storage medium is provided. In some embodiments, the non-transitory computer-readable storage medium may include computer program code for execution by one or more processors of a device. In some embodiments, the computer program code is configured to, when executed by the one or more processors, cause the device to receive a system architecture. In some embodiments, the system architecture is representative of a plurality of services and a plurality of services metadata datasets. In some embodiments, each of the plurality of services is associated with one of the plurality of services metadata datasets. In some embodiments, the computer program code is configured to, when executed by the one or more processors, cause the device to parse the system architecture to generate a plurality of services resource consumption representation requests. In some embodiments, the computer program code is configured to, when executed by the one or more processors, cause the device to process the plurality of services resource consumption representation requests using a plurality of services resource consumption utilization tools. In some embodiments, the computer program code is configured to, when executed by the one or more processors, cause the device to receive a plurality of services resource consumption responses from the plurality of services resource consumption utilization tools. In some embodiments, the computer program code is configured to, when executed by the one or more processors, cause the device to determine a services resource consumption based at least in part on the plurality of services resource consumption responses.

In some embodiments, parsing the system architecture to generate the plurality of services resource consumption representation requests is performed by a natural language processing machine learning model.

In some embodiments, the computer program code is configured to, when executed by the one or more processors, cause the device to receive a historical plurality of system architectures each of the historical plurality of system architectures representative of a historical plurality of services and a historical plurality of services metadata datasets. In some embodiments, each of the historical plurality of services is associated with one of the historical plurality of services metadata datasets. In some embodiments, the computer program code is configured to, when executed by the one or more processors, cause the device to train the natural language processing machine learning model based at least in part on the historical plurality of system architectures.

In some embodiments, at least a portion of the plurality of services metadata datasets is generated by a natural language processing machine learning model parsing a plurality of non-functional specifications associated with the plurality of services.

In some embodiments, the computer program code is configured to, when executed by the one or more processors, cause the device to receive a historical plurality of non-functional specifications associated with a historical plurality of services.

In some embodiments, the computer program code is configured to, when executed by the one or more processors, cause the device to train the natural language processing machine learning model based at least in part on the historical plurality of non-functional specifications.

In some embodiments, a first service of the plurality of services is associated with a first services resource consumption utilization tool of the plurality of services resource consumption utilization tools and a second service of the plurality of services is associated with a second services resource consumption utilization tool of the plurality of services resource consumption utilization tools.

In some embodiments, each of the plurality of services resource consumption representation requests are associated with one of a plurality of configurations.

In some embodiments, each of the plurality of services metadata datasets comprises one or more of a computing resource consumption metadata, services type metadata, usage metadata, user type metadata, regional deployment infrastructure metadata, or user identification metadata.

In some embodiments, the system architecture is representative of a computing system comprising a plurality of services and a plurality of connections between the plurality of services.

In some embodiments, the computer program code is configured to, when executed by the one or more processors, cause the device to cause the system architecture to be generated. In some embodiments, causing the system architecture to be generated includes causing an architecture component interface to be displayed on a user interface. In some embodiments, the architecture component interface comprises a plurality of architecture components each representative of the plurality of services. In some embodiments, causing the system architecture to be generated includes causing an architecture modeling interface to be displayed on the user interface. In some embodiments, causing the system architecture to be generated includes generating a plurality of architecture component requests. In some embodiments, each of the plurality of architecture component requests comprises an indication of a selection of one of the plurality of architecture components corresponding to one of the plurality of services and one of the plurality of services metadata datasets. In some embodiments, causing the system architecture to be generated includes providing the plurality of architecture component requests to a system architecture generation tool. In some embodiments, causing the system architecture to be generated includes causing an updated architecture modeling interface to be displayed on the user interface based at least in part on the plurality of architecture component requests. In some embodiments, the updated architecture modeling interface comprises the system architecture.

The above summary is provided merely for purposes of summarizing some example embodiments to provide a basic understanding of some aspects of the present disclosure.

Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Reference will now be made to the accompanying drawings. The components illustrated in the figures may or may not be present in certain embodiments described herein. Some embodiments may include fewer (or more) components than those shown in the figures in accordance with an example embodiment of the present disclosure.

FIG. 6 illustrates a flow chart of an example computer-implemented method in accordance with one or more embodiments of the present disclosure.

DETAILED DESCRIPTION

Figure 1:
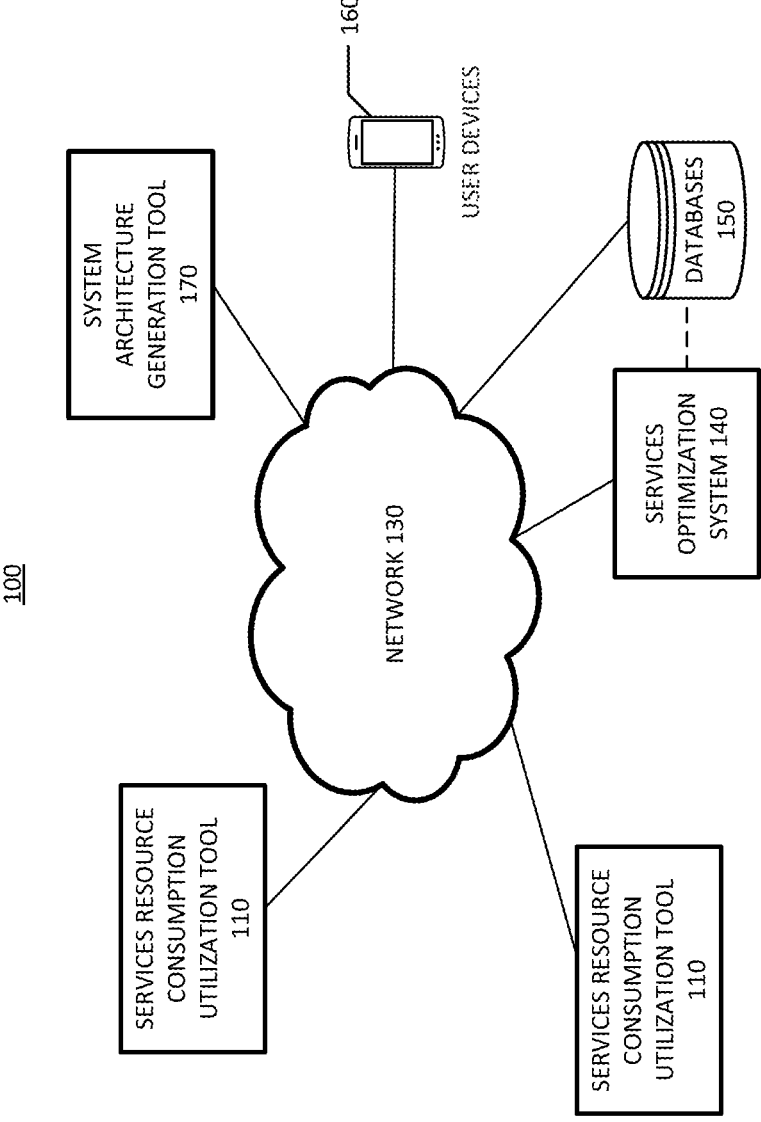
FIG. 1 illustrates an exemplary block diagram of an environment in which embodiments of the present disclosure may operate.

Example embodiments will be described more fully hereinafter with reference to the accompanying drawings, in which some, but not all embodiments of disclosure are shown. Indeed, embodiments of the disclosure may be embodied in many different forms and should not be construed as limited to the embodiments set forth herein; rather, these embodiments are provided so that this disclosure will satisfy applicable legal requirements. Like numbers refer to like elements throughout.

Overview

Example embodiments disclosed herein address technical problems associated with systems, apparatuses, methods, and computer program products for determining a services resource consumption. As would be understood by one skilled in the field to which this disclosure pertains, there are numerous example scenarios in which systems, apparatuses, methods, and computer program products for determining a services resource consumption are desirable.

In many applications, it may be desirable to be able to determine a services resource consumption associated with a computing system. For example, it may be desirable to determine a services resource consumption of a computing system represented by a system architecture. The system architecture may include a plurality of services that are implemented to form the computing system. In many applications, it may be desirable to determine a services resource consumption that indicates an expected lifetime of the plurality of services, an expected cost of operating the plurality of services, and/or the expected maintenance amount associated with the plurality of services. Additionally, in many applications it may be desirable to determine a services resource consumption based on a plurality of services metadata datasets associated with the plurality of services that make up a computing system.

Example solutions for determining a services resource consumption include determining a services resource consumption for a service. However, such an example solution for determining a services resource consumption does not contemplate determining a services resource consumption for a computing system made up of a plurality of services. Additionally, such an example solution for determining a services resource consumption does not contemplate determining a services resource consumption based at least in part on a system architecture representative of the computing system. Additionally, such an example solution for determining a services resource consumption does not contemplate determining a services resource consumption based at least in part on a plurality of services metadata datasets associated with the plurality of services that make up the computing system.

Thus, to address these and/or other issues related to determining a services resource consumption, example systems, apparatuses, computer program products, and/or methods are disclosed herein. For example, an embodiment described herein includes a computer-implemented method that may include receiving a system architecture. In some embodiments, the system architecture is representative of a plurality of services and a plurality of services metadata datasets. In some embodiments, each of the plurality of services is associated with one of the plurality of services metadata datasets. In some embodiments, the computer-implemented method may include parsing the system architecture to generate a plurality of services resource consumption representation requests. In some embodiments, the computer-implemented method may include processing the plurality of services resource consumption representation requests using a plurality of services resource consumption utilization tools. In some embodiments, the computer-implemented method may include receiving a plurality of services resource consumption responses from the plurality of services resource consumption utilization tools. In some embodiments, the computer-implemented method may include determining a services resource consumption based at least in part on plurality of services resource consumption responses. Accordingly, the systems, apparatuses, computer program products, and/or methods disclosed herein enable the determination of a services resource consumption of a computing system based at least in part on a system architecture and/or a plurality of services metadata datasets.

Example Apparatuses and Systems

Embodiments of the present disclosure herein include systems, apparatuses, methods, and computer program products related to systems, apparatuses, methods, and computer program products for determining a services resource consumption. It should be readily appreciated that the embodiments of the systems, apparatuses, methods, and computer program product described herein may be configured in various additional and alternative manners in addition to those expressly described herein.

FIG. 1 illustrates an exemplary block diagram of an environment 100 in which embodiments of the present disclosure may operate. Specifically, FIG. 1 illustrates a plurality of services resource consumption utilization tools 110. In some embodiments, each services resource consumption utilization tool of the plurality of services resource consumption utilization tools 110 is configured via hardware, software, firmware, and/or a combination thereof, to perform data reporting and/or other data output process(es) associated with processing a plurality of services resource consumption representation requests. In some embodiments, the environment 100 may include a system architecture generation tool 170. In some embodiments, the system architecture generation tool 170 may be configured via hardware, software, firmware, and/or a combination thereof, to perform data reporting and/or other data output process(es) associated with processing a plurality of architecture component requests.

The network 130 may be embodied in any of a myriad of network configurations. In some embodiments, the network 130 may be a public network (e.g., the Internet). In some embodiments, the network 130 may be a private network (e.g., an internal localized, or closed-off network between particular devices). In some other embodiments, the network 130 may be a hybrid network (e.g., a network enabling internal communications between particular connected devices and external communications with other devices). In various embodiments, the network 130 may include one or more base station(s), relay(s), router(s), switch(es), cell tower(s), communications cable(s), routing station(s), and/or the like. In various embodiments, components of the environment 100 may be communicatively coupled to transmit data to and/or receive data from one another over the network 130. Such configuration(s) include, without limitation, a wired or wireless Personal Area Network (PAN), Local Area Network (LAN), Metropolitan Area Network (MAN), Wide Area Network (WAN), and/or the like.

In some embodiments, the environment 100 may include a services optimization system 140. The services optimization system 140 may be electronically and/or communicatively coupled to the plurality of services resource consumption utilization tools 110, system architecture generation tool 170, one or more user devices 160, and/or the one or more databases 150. The services optimization system 140 may be located remotely, in proximity of, and/or within a particular services resource consumption utilization tool of the plurality of services resource consumption utilization tools 110 and/or the system architecture generation tool 170. In some embodiments, the services optimization system 140 is configured via hardware, software, firmware, and/or a combination thereof, to perform data intake of one or more types of data associated with one or more of the plurality of services resource consumption utilization tools 110 and/or the system architecture generation tool 170. Additionally or alternatively, in some embodiments, the services optimization system 140 is configured via hardware, software, firmware, and/or a combination thereof, to generate and/or transmit command(s) that control, adjust, or otherwise impact operations of one or more of, the one or more databases 150, the plurality of services resource consumption utilization tools 110, and/or the system architecture generation tool 170. Additionally or alternatively still, in some embodiments, the services optimization system 140 is configured via hardware, software, firmware, and/or a combination thereof, to perform data reporting and/or other data output process(es) associated with monitoring or otherwise analyzing operations of one or more of the one or more databases 150, the plurality of services resource consumption utilization tools 110, and/or system architecture generation tool 170, for example for generating and/or outputting report(s) corresponding to the operations performed via the plurality of services resource consumption utilization tools 110 and/or system architecture generation tool 170. For example, in various embodiments, the services optimization system 140 may be configured to execute and/or perform one or more operations and/or functions described herein.

The one or more databases 150 may be configured to receive, store, and/or transmit data. In some embodiments, the one or more databases 150 may be associated with one or more datasets associated with the plurality of services resource consumption utilization tools 110 and/or system architecture generation tool 170. In some embodiments, the one or more databases 150 may be associated with datasets received and/or generated by the services optimization system 140 in real-time. Additionally or alternatively, the one or more databases 150 may be associated with datasets received and/or generated by the services optimization system 140 on a periodic basis (e.g., the datasets may be received and/or generated by the services optimization system 140 once per day). Additionally or alternatively, the one or more databases 150 may be associated with datasets received by the services optimization system 140 after the services optimization system 140 has requested the datasets. Additionally or alternatively, the one or more databases 150 may be associated with datasets based on an input (e.g., a user input) into the services optimization system 140 and/or the one or more user devices 160.

The one or more user devices 160 may be associated with users of services optimization system 140. In various embodiments, the services optimization system 140 may generate and/or transmit a message, alert, or indication to a user via one or more user devices 160. Additionally, or alternatively, the one or more user devices 160 may be utilized by a user to remotely access a services optimization system 140. This may be by, for example, an application operating on the one or more user devices 160. A user may access the services optimization system 140 remotely, including one or more visualizations, reports, and/or real-time displays.

Additionally, while FIG. 1 illustrates certain components as separate, standalone entities communicating over the network 130, various embodiments are not limited to this configuration. In other embodiments, one or more components may be directly connected and/or share hardware or the like. For example, in some embodiments, the services optimization system 140 may include one or more databases 150, which may collectively be located in or at the plurality of services resource consumption utilization tools 110 or the system architecture generation tool 170 (e.g., the services optimization system 140, the system architecture generation tool 170, the one or more databases 150, and/or the plurality of services resource consumption utilization tools 110 may be combined into a single component).

Figure 2:
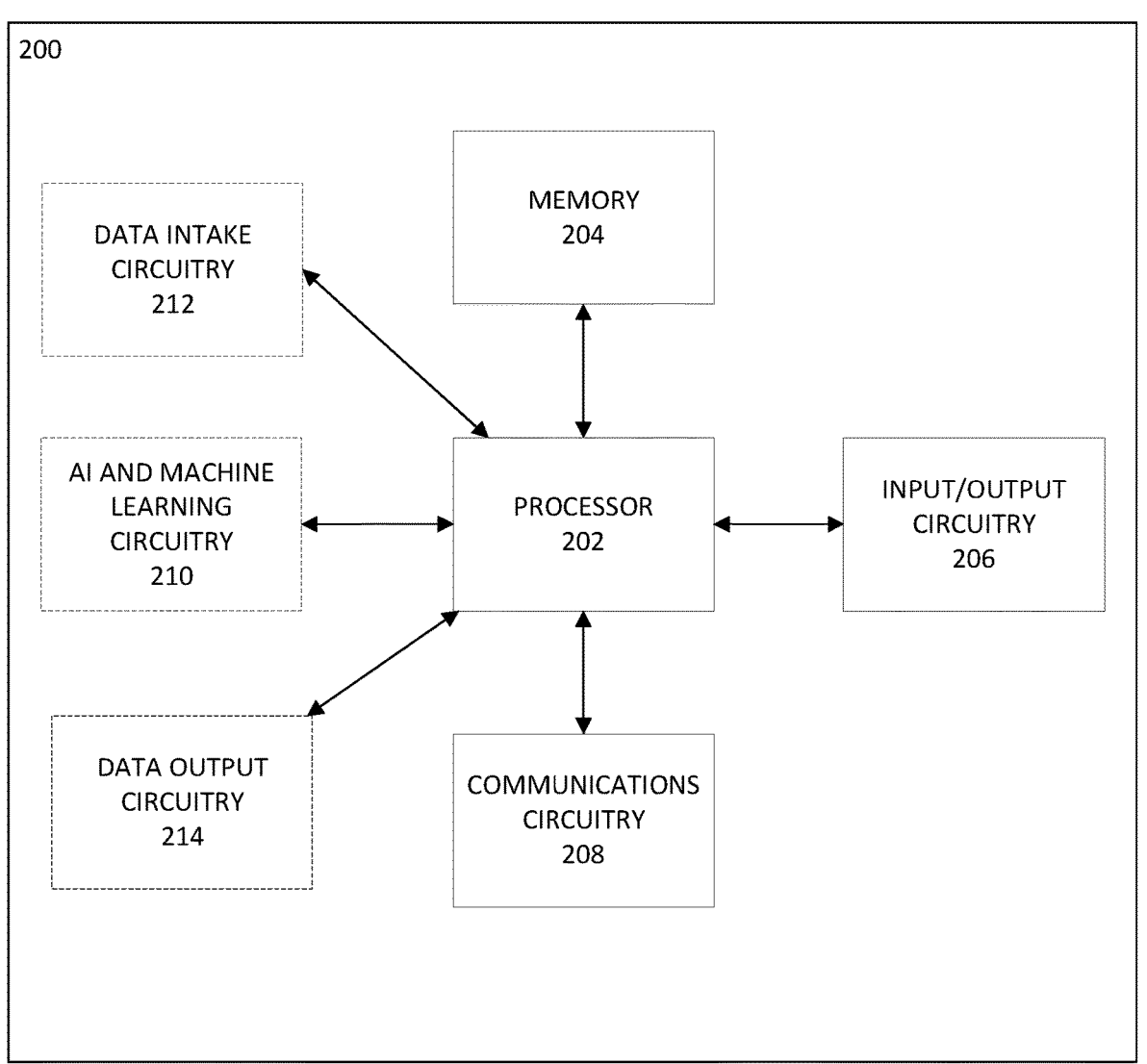
FIG. 2 illustrates an exemplary block diagram of an example apparatus that may be specially configured in accordance with one or more embodiments of the present disclosure.
Figure 3:
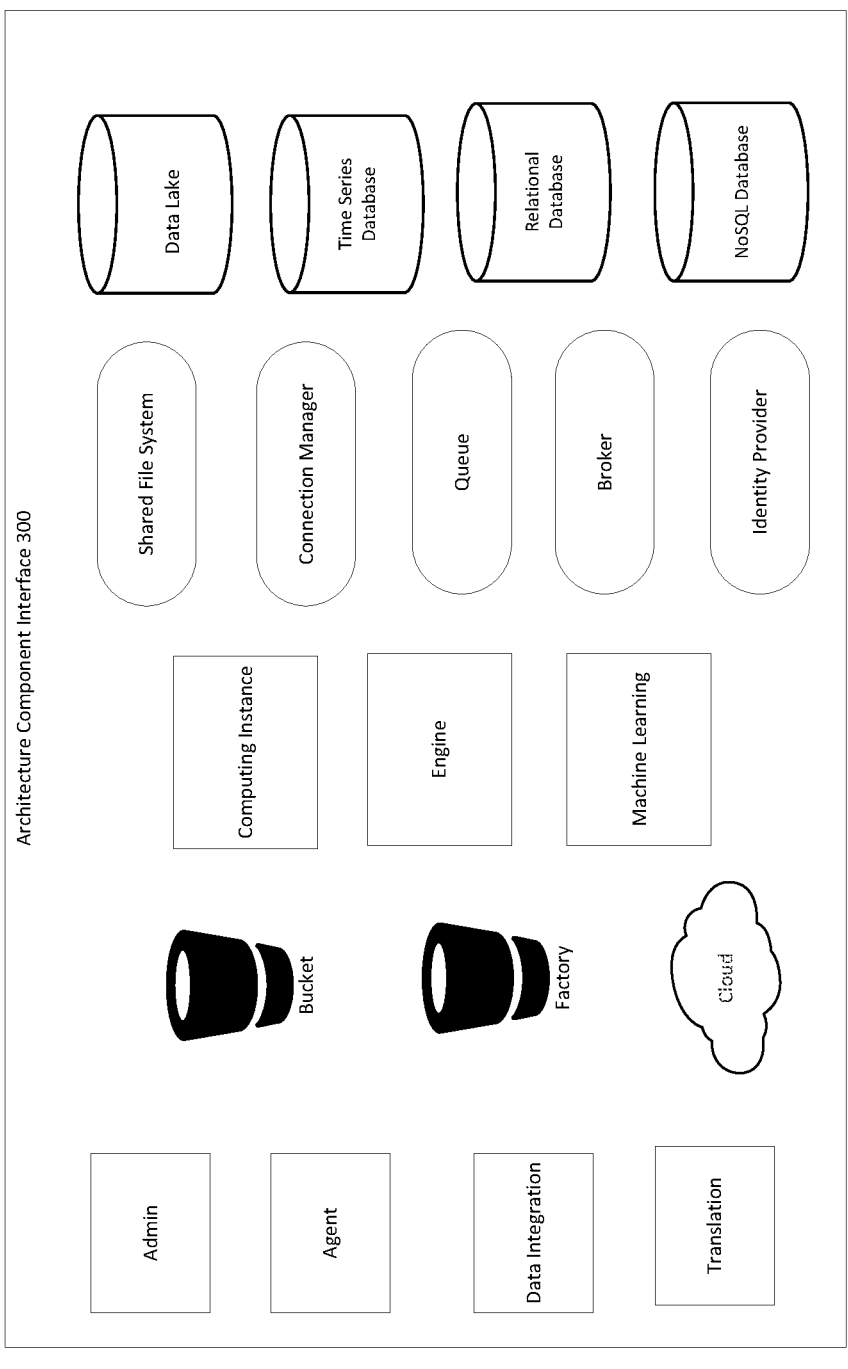
FIG. 3 illustrates an example architecture component interface in accordance with one or more embodiments of the present disclosure.
Figure 4:
FIG. 4 illustrates an example architecture modeling interface in accordance with one or more embodiments of the present disclosure.
Figure 5:
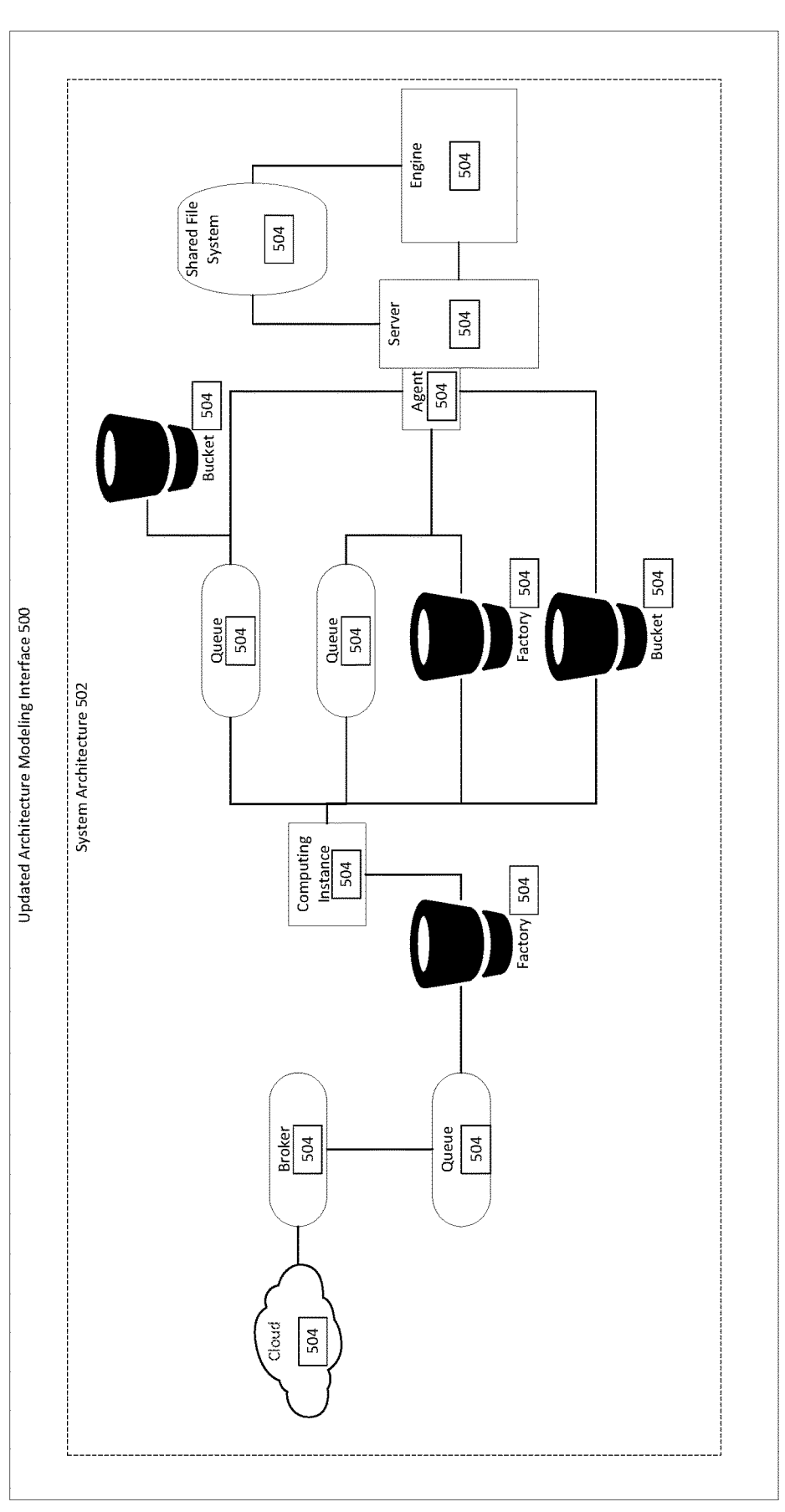
FIG. 5 illustrates an example updated architecture modeling interface in accordance with one or more embodiments of the present disclosure.

FIG. 2 illustrates an exemplary block diagram of an example apparatus that may be specially configured in accordance with an example embodiment of the present disclosure. Specifically, FIG. 2 depicts an example computing apparatus 200 ("apparatus 200") specially configured in accordance with at least some example embodiments of the present disclosure. For example, the computing apparatus 200 may be embodied as one or more of a specifically configured personal computing apparatus, a specifically configured cloud based computing apparatus, and/or the like. Examples of an apparatus 200 may include, but is not limited to, the services optimization system 140, the plurality of services resource consumption utilization tools 110, the system architecture generation tool 170, the one or more user devices 160, and/or the one or more databases 150. The apparatus 200 includes processor 202, memory 204, input/output circuitry 206, communications circuitry 208, and/or optional artificial intelligence ("AI") and machine learning circuitry 210. In some embodiments, the apparatus 200 is configured to execute and perform the operations described herein.

Although components are described with respect to functional limitations, it should be understood that the particular implementations necessarily include the use of particular computing hardware. It should also be understood that in some embodiments certain of the components described herein include similar or common hardware. For example, in some embodiments two sets of circuitry both leverage use of the same processor(s), memory(ies), circuitry(ies), and/or the like to perform their associated functions such that duplicate hardware is not required for each set of circuitry.

In various embodiments, such as computing apparatus 200 of a services optimization system 140, the plurality of services resource consumption utilization tools 110, the system architecture generation tool 170, and/or the one or more user devices 160 may refer to, for example, one or more computers, computing entities, desktop computers, mobile phones, tablets, phablets, notebooks, laptops, distributed systems, servers, or the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein. In one embodiment, these functions, operations, and/or processes can be performed on data, content, information, and/or similar terms used herein. In this regard, the apparatus 200 embodies a particular, specially configured computing entity transformed to enable the specific operations described herein and provide the specific advantages associated therewith, as described herein.

Processor 202 or processor circuitry 202 may be embodied in a number of different ways. In various embodiments, the use of the terms "processor" should be understood to include a single core processor, a multi-core processor, multiple processors internal to the apparatus 200, and/or one or more remote or "cloud" processor(s) external to the apparatus 200. In some example embodiments, processor 202 may include one or more processing devices configured to perform independently. Alternatively, or additionally, processor 202 may include one or more processor(s) configured in tandem via a bus to enable independent execution of operations, instructions, pipelining, and/or multithreading.

In an example embodiment, the processor 202 may be configured to execute instructions stored in the memory 204 or otherwise accessible to the processor. Alternatively, or additionally, the processor 202 may be configured to execute hard-coded functionality. As such, whether configured by hardware or software methods, or by a combination thereof, processor 202 may represent an entity (e.g., physically embodied in circuitry) capable of performing operations according to embodiments of the present disclosure while configured accordingly. Alternatively, or additionally, processor 202 may be embodied as an executor of software instructions, and the instructions may specifically configure the processor 202 to perform the various algorithms embodied in one or more operations described herein when such instructions are executed. In some embodiments, the processor 202 includes hardware, software, firmware, and/or a combination thereof that performs one or more operations described herein.

In some embodiments, the processor 202 (and/or co-processor or any other processing circuitry assisting or otherwise associated with the processor) is/are in communication with the memory 204 via a bus for passing information among components of the apparatus 200.

Memory 204 or memory circuitry 204 may be non-transitory and may include, for example, one or more volatile and/or non-volatile memories. In some embodiments, the memory 204 includes or embodies an electronic storage device (e.g., a computer readable storage medium). In some embodiments, the memory 204 is configured to store information, data, content, applications, instructions, or the like, for enabling an apparatus 200 to carry out various operations and/or functions in accordance with example embodiments of the present disclosure.

Input/output circuitry 206 may be included in the apparatus 200. In some embodiments, input/output circuitry 206 may provide output to the user and/or receive input from a user. The input/output circuitry 206 may be in communication with the processor 202 to provide such functionality. The input/output circuitry 206 may comprise one or more user interface(s). In some embodiments, a user interface may include a display that comprises the interface(s) rendered as a web user interface, an application user interface, a user device, a backend system, or the like. In some embodiments, the input/output circuitry 206 also includes a keyboard, a mouse, a joystick, a touch screen, touch areas, soft keys a microphone, a speaker, or other input/output mechanisms. The processor 202 and/or input/output circuitry 206 comprising the processor may be configured to control one or more operations and/or functions of one or more user interface elements through computer program instructions (e.g., software and/or firmware) stored on a memory accessible to the processor (e.g., memory 204, and/or the like). In some embodiments, the input/output circuitry 206 includes or utilizes a user-facing application to provide input/output functionality to a display associated with a user.

Communications circuitry 208 may be included in the apparatus 200. The communications circuitry 208 may include any means such as a device or circuitry embodied in either hardware or a combination of hardware and software that is configured to receive and/or transmit data from/to a network and/or any other device, circuitry, or module in communication with the apparatus 200. In some embodiments the communications circuitry 208 includes, for example, a network interface for enabling communications with a wired or wireless communications network. Additionally or alternatively, the communications circuitry 208 may include one or more network interface card(s), antenna(s), bus(es), switch(es), router(s), modem(s), and supporting hardware, firmware, and/or software, or any other device suitable for enabling communications via one or more communications network(s). In some embodiments, the communications circuitry 208 may include circuitry for interacting with an antenna(s) and/or other hardware or software to cause transmission of signals via the antenna(s) and/or to handle receipt of signals received via the antenna(s). In some embodiments, the communications circuitry 208 enables transmission to and/or receipt of data from a user device and/or other external computing device(s) in communication with the apparatus 200.

Data intake circuitry 212 may be included in the apparatus 200. The data intake circuitry 212 may include hardware, software, firmware, and/or a combination thereof, designed and/or configured to capture, receive, request, and/or otherwise gather data. In some embodiments, the data intake circuitry 212 includes hardware, software, firmware, and/or a combination thereof, that communicates with one or more components of the plurality of services resource consumption utilization tools 110, the system architecture generation tool 170, the one or more user devices 160, and/or the one or more databases 150 to receive particular data. Additionally or alternatively, in some embodiments, the data intake circuitry 212 includes hardware, software, firmware, and/or a combination thereof, that retrieves particular data associated with plurality of services resource consumption utilization tools 110, the system architecture generation tool 170, the one or more user devices 160, and/or the one or more databases 150 from one or more data repository/repositories accessible to the apparatus 200.

AI and machine learning circuitry 210 may be included in the apparatus 200. The AI and machine learning circuitry 210 may include hardware, software, firmware, and/or a combination thereof designed and/or configured to request, receive, process, generate, and transmit data, datasets, data structures, control signals, and electronic information for training and executing a trained AI and machine learning model configured to facilitating the operations and/or functionalities described herein. For example, in some embodiments the AI and machine learning circuitry 210 includes hardware, software, firmware, and/or a combination thereof, that identifies training data and/or utilizes such training data for training a particular machine learning model, AI, and/or other model to generate particular output data based at least in part on learnings from the training data (e.g., a natural language processing machine learning model). Additionally or alternatively, in some embodiments, the AI and machine learning circuitry 210 includes hardware, software, firmware, and/or a combination thereof, that embodies or retrieves a trained machine learning model, AI and/or other specially configured model utilized to process inputted data. Additionally or alternatively, in some embodiments, the AI and machine learning circuitry 210 includes hardware, software, firmware, and/or a combination thereof that processes received data utilizing one or more algorithm(s), function(s), subroutine(s), and/or the like, in one or more pre-processing and/or subsequent operations that need not utilize a machine learning or AI model.

Data output circuitry 214 may be included in the apparatus 200. The data output circuitry 214 may include hardware, software, firmware, and/or a combination thereof, that configures and/or generates an output based at least in part on data processed by the apparatus 200. In some embodiments, the data output circuitry 214 includes hardware, software, firmware, and/or a combination thereof, that generates a particular report based at least in part on the processed data, for example where the report is generated based at least in part on a particular reporting protocol. Additionally or alternatively, in some embodiments, the data output circuitry 214 includes hardware, software, firmware, and/or a combination thereof, that configures a particular output data object, output data file, and/or user interface for storing, transmitting, and/or displaying. For example, in some embodiments, the data output circuitry 214 generates and/or specially configures a particular data output for transmission to another system sub-system for further processing. Additionally or alternatively, in some embodiments, the data output circuitry 214 includes hardware, software, firmware, and/or a combination thereof, that causes rendering of a specially configured user interface based at least in part on data received by and/or processing by the apparatus 200.

In some embodiments, two or more of the sets of circuitries 202-214 are combinable. Alternatively, or additionally, one or more of the sets of circuitry 202-214 perform some or all of the operations and/or functionality described herein as being associated with another circuitry. In some embodiments, two or more of the sets of circuitry 202-214 are combined into a single module embodied in hardware, software, firmware, and/or a combination thereof. For example, in some embodiments, one or more of the sets of circuitry, for example the AI and machine learning circuitry 210, may be combined with the processor 202, such that the processor 202 performs one or more of the operations described herein with respect the AI and machine learning circuitry 210.

With reference to FIGS. 1-5, the services optimization system 140 may be configured to receive a system architecture. For example, the services optimization system 140 may be configured to receive a system architecture such as the example system architecture 502 illustrated in FIG. 5. In some embodiments, the system architecture may be an architecture of a computing system that is configured via hardware, software, firmware, and/or a combination thereof, to perform one or more computing tasks. For example, the computing system may be configured to receive one or more computing files in a first format from another computing system, transform the one or more computing files into a second format, and transmit the one or more computing files into another format.

In some embodiments, the system architecture may be representative of a plurality of services. In some embodiments, each of the plurality of services may be components of a computing system configured to at least in part perform the one or more computing tasks that are performed by the computing system. In some embodiments, the plurality of services may include one or more of a data lake service, a time series database service, a relational database service, a noSQL database service, a shared file system service, a connection manager service, a queue service, a broker service, a computing instance service, an engine service, an admin service, an agent service, a bucket service, a factory service, a machine learning service, a translation service, a data integration service, an identity provider service, and/or a cloud service. For example, a queue service may be configured to temporarily store a first computing file while a computing instance service is transforming another computing file from a first format to a second format. In some embodiments, the plurality of services may be connected by a plurality of connections through which data can be transferred between the plurality of services. For example, a queue service may be connected to a computing instance.

Additionally or alternatively, the system architecture may be representative of a plurality of services metadata datasets. In some embodiments, each of the plurality of services is associated with one of the plurality of services metadata datasets. For example, as illustrated in the example system architecture 502 in FIG. 5, each of the plurality of services is associated with one of the plurality of services metadata datasets 504.

In some embodiments, the plurality of services metadata datasets may include computing resource consumption metadata. For example, computing resource consumption metadata may indicate how much processing power and/or memory a service of the plurality of services consumes when operating. In some embodiments, the plurality of services metadata datasets may include services type metadata. For example, services type metadata may identify the type of service (e.g., a service of the plurality of services is a computing instance service). In some embodiments, the plurality of services metadata datasets may include usage metadata. For example, usage metadata may indicate how often a service of the plurality of services is used (e.g., a service is used 16 hours per day, 8 hours a day, etc.). In some embodiments, the plurality of services metadata datasets may include a user type metadata. For example, user type metadata may indicate the type of user associated with a particular service (e.g., a high use user or a low use user). In some embodiments, the plurality of services metadata datasets may include regional deployment infrastructure metadata. For example regional deployment infrastructure metadata may indicate a region (e.g., west coast) that a service of the plurality of services is associated with. In some embodiments, the plurality of services metadata datasets may include user identification metadata. For example, user metadata may indicate which user of a plurality of users is associated with a service of the plurality of services.

In some embodiments, the services optimization system 140 may be configured to generate at least a portion of the plurality of services metadata datasets using a natural language processing machine learning model (e.g., AI and machine learning circuitry 210). In this regard, for example, the natural language processing machine learning model may be configured to parse one or more non-functional specifications associated with the plurality of services (e.g., specifications of the plurality of services). For example, using the natural language processing machine learning model, the services optimization system 140 may be configured to parse a non-functional specification associated with a service to determine services type metadata.

In some embodiments, the services optimization system 140 may be configured to train the natural language processing machine learning model. In this regard, for example, the services optimization system 140 may be configured to receive a historical plurality of non-functional specifications associated with a historical plurality of services. In some embodiments, each of the historical plurality of services may be associated with one of the historical plurality of services metadata datasets. In this regard, for example, based on the training using the historical plurality of non-functional specifications associated with the historical plurality of services, the services optimization system 140 may be configured, using the natural language processing machine learning model, to parse the plurality of non-functional specifications associated with the plurality of services to generate at least a portion of the plurality of services metadata datasets.

In some embodiments, the services optimization system 140 may be configured to cause the system architecture to be generated. For example, the services optimization system 140 may be configured to cause the system architecture generation tool 170 to at least in part generate the system architecture. In this regard, for example, the services optimization system 140 may be configured to cause the system architecture generation tool 170 to display an architecture component interface 300 on a user interface (e.g., user interface 214 of the services optimization system 140). In some embodiments, the architecture component interface 300 may include a plurality of architecture components with each of the plurality of architecture components representative of one of the plurality of services. In this regard, for example, the architecture component interface 300 may include one or more of data lake architecture component, a time series database architecture component, a relational database architecture component, a noSQL database architecture component, a shared file system architecture component, a connection manager architecture component, a queue architecture component, a broker architecture component, a computing instance architecture component, an engine architecture component, an admin architecture component, an agent architecture component, a bucket architecture component, a factory architecture component, a machine learning architecture component, a translation architecture component, a data integration architecture component, an identity provider architecture component, and/or a cloud architecture component.

In some embodiments, causing the system architecture to be generated includes the services optimization system 140 being configured to cause the system architecture generation tool 170 to display an architecture modeling interface 400 on a user interface. In some embodiments, the architecture component interface 300 and the architecture modeling interface 400 may be configured to be displayed simultaneously on the user interface. For example, the architecture component interface 300 and the architecture modeling interface 400 may be configured to be displayed side by side on the user interface.

In some embodiments, causing the system architecture to be generated includes the services optimization system 140 being configured to generate a plurality of architecture component requests. In some embodiments, each of the plurality of architecture component requests may include an indication of a selection of one of the plurality of architecture components corresponding to one of the plurality of services and one of the plurality of services metadata datasets. Said differently, each of the plurality of architecture component requests may include an indication of one of the plurality of services in the system architecture and a services metadata dataset that corresponds to the one of the plurality of services. In this regard, the plurality of architecture component requests may include an indication of the plurality of services in the system architecture and the plurality of services metadata datasets associated with each of the plurality of services in the system architecture.

In some embodiments, causing the system architecture to be generated includes the services optimization system 140 being configured to provide the plurality of architecture component requests to the system architecture generation tool 170. In some embodiments, causing the system architecture to be generated includes the services optimization system 140 being configured to cause the system architecture generation tool 170 to generate an updated architecture modeling interface 500 to be displayed on a user interface based at least in part on the plurality of architecture component requests. In some embodiments, the updated architecture modeling interface 500 may include the system architecture (e.g., example system architecture 502 displays the plurality of services in the system architecture and the each of the plurality of services metadata datasets 504 associated with each of the plurality of services). In this regard, the updated architecture modeling interface 500 may be configured to display the generated system architecture.

In some embodiments, the services optimization system 140 may be configured to parse the system architecture. In some embodiments, by parsing the system architecture, the services optimization system 140 may be configured to generate a plurality of services resource consumption representation requests. In some embodiments, each of the plurality of services resource consumption representation requests may be configured to be processed by one of a plurality of services resource consumption utilization tools 110. In this regard, for example, each of the plurality of services resource consumption representation requests may include data representative of at least some of the plurality of services and/or the plurality of services metadata datasets included in the system architecture.

In some embodiments, for example, by parsing the system architecture, the services optimization system 140 may be configured to generate a plurality of services resource consumption representation requests that each include data representative of at least some of the plurality of services and/or the plurality of services metadata datasets include in the system architecture. For example, by parsing the example system architecture 502, the services optimization system 140 may be configured to generate a plurality of services resource consumption representation requests that each include data representative of at least one or more of a cloud service, a broker service, a queue service, a factory service, a computing instance service, a bucket service, an agent service, a server service, an engine service, a machine learning service, a translation service, a data integration service, an identity provider service, and/or a shared file system service. Additionally or alternatively, for example, by parsing the example system architecture 502, the services optimization system 140 may be configured to generate a plurality of services resource consumption representation requests that each include data representative of at least some of the plurality of services metadata datasets. Said differently, the plurality of services resource consumption representation requests include data that identifies the plurality of services and the plurality of services metadata datasets that are associated with a system architecture.

In some embodiments, for example, the services optimization system 140 may parse the system architecture such that the generated plurality of services resource consumption representation requests each include data representative of a subset of the plurality of services and/or the plurality of services metadata datasets. For example, the services optimization system 140 may parse the system architecture such that the generated plurality of services resource consumption representation requests includes a first services resource consumption representation request that includes data representative of a first subset of the plurality of services and/or the plurality of services metadata datasets and a second services resource consumption representation request that includes data representative of a second subset of the plurality of services and/or the plurality of services metadata datasets. That is, the first services resource consumption representation request includes data that identifies a first subset of the plurality of the plurality of services and/or the plurality of services metadata datasets and the second services resource consumption representation request includes data that identifies a second subset of the plurality of the plurality of services and/or the plurality of services metadata datasets.

In some embodiments, each of the plurality of services resource consumption utilization tools 110 may be configured to process data representative of only some of the plurality of services and/or the plurality of services metadata datasets. For example, a first resource consumption utilization tool may be a cloud services based resource consumption utilization tool configured to process data representative of a cloud service and/or a cloud service services metadata dataset and a second resource consumption utilization tool may be a factory services based resource consumption utilization tool configured to process data representative of a factory service and/or a factory service services metadata dataset. In this regard, for example, by parsing the system architecture to generate a plurality of services resource consumption representation requests that each include data representative of a subset of the plurality of services and/or the plurality of services metadata datasets, the services optimization system 140 may be configured to segregate the data representative of the system architecture such that it can be processed by a corresponding one of the plurality of services resource consumption utilization tools 110.

In some embodiments, for example, the services optimization system 140 may parse the system architecture such that each of the generated plurality of services resource consumption representation requests are associated with one of a plurality of configurations. In this regard, for example, the services optimization system 140 may parse the system architecture such that the data representative of a subset of the plurality of services and/or the plurality of services metadata datasets is arranged in one of the plurality of configurations. For example, the services optimization system 140 may parse the system architecture such that the data representative of a first subset of the plurality of services and/or the plurality of services metadata datasets is arranged in a first configuration (e.g., a first services resource consumption representation request is associated with a first configuration) and the data representative of a second subset of the plurality of services and/or the plurality of services metadata datasets is arranged in a second configuration (e.g., a second services resource consumption representation request is associated with a second configuration).

In some embodiments, each of the plurality of services resource consumption utilization tools 110 may only be configured to process a services resource consumption representation request if the services resource consumption representation request is associated with one of the plurality of configurations. In this regard, for example, by parsing the system architecture such that each of the generated plurality of services resource consumption representation requests are associated with one of a plurality of configurations, the services optimization system 140 may ensure that each of the plurality of services resource consumption representation requests may be appropriately processed by an associated services resource consumption utilization tool.

In some embodiments, the services optimization system 140 may be configured to parse the system architecture to generate the plurality of services resource consumption representation requests using a natural language processing machine learning model (e.g., AI and machine learning circuitry 210). In this regard, for example, the natural language processing machine learning model may be configured to parse the system architecture such that the generated plurality of services resource consumption representation requests each include data representative of a subset of the plurality of services and/or the plurality of services metadata datasets. Said differently, the natural language processing machine learning model may be configured to distinguish between services and services metadata datasets such that a plurality of services resource consumption representation requests may be generated that each include the data representative of the appropriate plurality of services and/or the plurality of services metadata datasets for a corresponding services resource consumption utilization tool.

In some embodiments, the services optimization system 140 may be configured to train the natural language processing machine learning model (e.g., AI and machine learning circuitry 210). In this regard, for example, the services optimization system 140 may be configured to receive a historical plurality of system architectures each of the historical plurality of system architectures representative of a historical plurality of services and a historical plurality of services metadata datasets. In this regard, for example, the historical plurality of system architectures may be used to train the natural language processing machine learning model such that the natural language processing machine learning model can appropriately identify and distinguish between services and services metadata datasets.

In some embodiments, the services optimization system 140 may be configured to process the plurality of services resource consumption representation requests using the plurality of services resource consumption utilization tools 110. In some embodiments, the services optimization system 140 may be configured to receive a plurality of services resource consumption responses from at least some of the plurality of services resource consumption utilization tools 110. In this regard, for example, the services optimization system 140 may be configured to receive a services resource consumption response for each of the plurality of services resource consumption representation requests generated by the services optimization system 140. That is, the services optimization system 140 may generate a services resource consumption representation request for at least some of the plurality of services resource consumption utilization tools 110 and receive a corresponding services resource consumption response from the at least some of the plurality of services resource consumption utilization tools 110.

In some embodiments, each of the plurality of services resource consumption responses may include data representative of a preliminary services resource consumption. In this regard, for example, each of the plurality of services resources consumption responses may include data representative of a preliminary services resource consumption associated with the services resource consumption representation request processed by the corresponding services resource consumption utilization tool. Said differently, each of the plurality of services resources consumption responses may include data representative of the preliminary services resource consumption of the subset of the plurality of services associated with the services resource consumption representation request associated with the services resource consumption utilization tool.

In some embodiments, for example, a preliminary services resource consumption may be indicative of an expected lifetime of the subset of the plurality of services. In this regard, the expected lifetime of the subset of the plurality of services may be an amount of time the subset of the plurality of services may operate before having to be replaced. As another example, a preliminary services resource consumption may be indicative of an expected cost of operating the subset of the plurality of services. In this regard, the expected cost of operating the subset of the plurality of services may be, for example, the cost charged by a provider of the subset of the plurality of services. As another example, a preliminary services resource consumption may be indicative of an expected maintenance amount associated with the subset of the plurality of services. In this regard, the expected maintenance amount may be indicative of the amount of resources that must be used to ensure the subset of the plurality of services continuously operate in a normal manner.

In some embodiments, a preliminary services resource consumption may be based at least in part on at least a portion of one or more of the plurality of services metadata datasets. For example, the expected cost of operating the subset of the plurality of services may be based at least in part on services type metadata (e.g., the type of service may impact the expected cost of operating a service). As another example, the expected maintenance amount of operating the subset of the plurality of services may be based at least in part on user type metadata (e.g., the type of user who uses a service may impact an expected maintenance amount associated with the service).

In some embodiments, the services optimization system 140 may be configured to determine a services resource consumption. In some embodiments, the services resource consumption may be based at least in part on the plurality of services resource consumption responses. In this regard, the services resource consumption may be based at least in part on each of the preliminary services resource consumption. In some embodiments, the services optimization system 140 may be configured to determine the services resource consumption by aggregating the preliminary services resource consumption responses to determine the services resource consumption. In this regard, the services resource consumption may be representative of the plurality of services (e.g., all of the subsets of the plurality of services). For example, the services resource consumption may be indicative of an expected lifetime of the plurality of services. As another example, the services resource consumption may be indicative of an expected cost of operating the plurality of services. As another example, the services resource consumption may be indicative of an expected maintenance amount associated with the subset of the plurality of services.

Additionally or alternatively, the services resource consumption may be based at least in part on the plurality of services metadata datasets (e.g., additionally or alternatively to the plurality of services resource consumption responses). In some embodiments, the services resource consumption may be based at least in part on usage metadata. In this regard, for example, if the usage metadata indicates that one or more of the plurality of services is associated with a high usage, the services resource consumption may indicate that the plurality of services have a low expected lifetime, a high expected maintenance amount, and/or a high expected cost. As another example, if the usage metadata indicates that one or more of the plurality of services is associated with a low usage, the services resource consumption may indicate that the plurality of services have a long expected lifetime, a low expected maintenance amount, and/or a low expected cost.

In some embodiments, the services resource consumption may be based at least in part on computing resource consumption metadata. In this regard, for example, if the computing resource consumption metadata indicates that one or more of the plurality of services is associated with a high computing resource consumption, the services resource consumption may indicate that the plurality of services have a low expected lifetime, a high expected maintenance amount, and/or a high expected cost. As another example, if the usage metadata indicates that one or more of the plurality of services is associated with a low computing resource consumption, the services resource consumption may indicate that the plurality of services have a long expected lifetime, a low expected maintenance amount, and/or a low expected cost.

Example Methods

Referring now to FIG. 6, a flowchart providing an example computer-implemented method 600 is illustrated. In this regard, FIG. 6 illustrates operations that may be performed by the services optimization system 140, the plurality of services resource consumption utilization tools 110, the system architecture generation tool 170, the one or more user devices 160, and/or the one or more databases 150, and/or components of the services optimization system 140, the plurality of services resource consumption utilization tools 110, the system architecture generation tool 170, the one or more user devices 160, and/or the one or more databases 150.

As shown in block 602, the computer-implemented method 600 may include receiving a system architecture. As described above, in some embodiments, the system architecture may be representative of a plurality of services. In some embodiments, each of the plurality of services may be components of a computing system configured to at least in part perform the one or more computing tasks that are performed by the computing system. In some embodiments, the plurality of services may include one or more of a data lake service, a time series database service, a relational database service, a noSQL database service, a shared file system service, a connection manager service, a queue service, a broker service, a computing instance service, an engine service, an admin service, an agent service, a bucket service, a factory service, a machine learning service, a translation service, a data integration service, an identity provider service, and/or a cloud service. For example, a queue service may be configured to temporarily store a first computing file while a computing instance service is transforming another computing file from a first format to a second format. In some embodiments, the plurality of services may be connected by a plurality of connections through which data can be transferred between the plurality of services. For example, a queue service may be connected to a computing instance. Additionally or alternatively, the system architecture may be representative of a plurality of services metadata datasets. In some embodiments, each of the plurality of services is associated with one of the plurality of services metadata datasets.

In some embodiments, the plurality of services metadata datasets may include computing resource consumption metadata. For example, computing resource consumption metadata may indicate how much processing power and/or memory a service of the plurality of services consumes when operating. In some embodiments, the plurality of services metadata datasets may include services type metadata. For example, services type metadata may identify the type of service (e.g., a service of the plurality of services is a computing instance service). In some embodiments, the plurality of services metadata datasets may include usage metadata. For example, usage metadata may indicate how often a service of the plurality of services is used (e.g., a service is used 16 hours per day, 8 hours a day, etc.). In some embodiments, the plurality of services metadata datasets may include a user type metadata. For example, user type metadata may indicate the type of user associated with a particular service (e.g., a high use user or a low use user). In some embodiments, the plurality of services metadata datasets may include regional deployment infrastructure metadata. For example regional deployment infrastructure metadata may indicate a region (e.g., west coast) that a service of the plurality of services is associated with. In some embodiments, the plurality of services metadata datasets may include user identification metadata. For example, user metadata may indicate which user of a plurality of users is associated with a service of the plurality of services.

As shown in block 604, the computer-implemented method 600 may include parsing the system architecture to generate a plurality of services resource consumption representation requests. As described above, in some embodiments, by parsing the system architecture a plurality of services resource consumption representation requests may be generated. In some embodiments, each of the plurality of services resource consumption representation requests may be configured to be processed by one of a plurality of services resource consumption utilization tools. In this regard, for example, each of the plurality of services resource consumption representation requests may include data representative of at least some of the plurality of services and/or the plurality of services metadata datasets included in the system architecture.

In some embodiments, for example, by parsing the system architecture a plurality of services resource consumption representation requests that each include data representative of at least some of the plurality of services and/or the plurality of services metadata datasets include in the system architecture may be generated. For example, by parsing the example system architecture, a plurality of services resource consumption representation requests that each include data representative of at least one or more of a cloud service, a broker service, a queue service, a factory service, a computing instance service, a bucket service, an agent service, a server service, an engine service, a machine learning service, a translation service, a data integration service, an identity provider service, and/or a shared file system service may be generated. Additionally or alternatively, for example, a plurality of services resource consumption representation requests that each include data representative of at least some of the plurality of services metadata datasets may be generated. Said differently, the plurality of services resource consumption representation requests include data that identifies the plurality of services and the plurality of services metadata datasets that are associated with a system architecture.

In some embodiments, for example, the system architecture may be parsed such that the generated plurality of services resource consumption representation requests each include data representative of a subset of the plurality of services and/or the plurality of services metadata datasets. For example, the system architecture may be parsed such that the generated plurality of services resource consumption representation requests includes a first services resource consumption representation request that includes data representative of a first subset of the plurality of services and/or the plurality of services metadata datasets and a second services resource consumption representation request that includes data representative of a second subset of the plurality of services and/or the plurality of services metadata datasets. That is, the first services resource consumption representation request includes data that identifies a first subset of the plurality of the plurality of services and/or the plurality of services metadata datasets and the second services resource consumption representation request includes data that identifies a second subset of the plurality of the plurality of services and/or the plurality of services metadata datasets.

In some embodiments, each of the plurality of services resource consumption utilization tools may be configured to process data representative of only some of the plurality of services and/or the plurality of services metadata datasets. For example, a first resource consumption utilization tool may be a cloud services based resource consumption utilization tool configured to process data representative of a cloud service and/or a cloud service services metadata dataset and a second resource consumption utilization tool may be a factory services based resource consumption utilization tool configured to process data representative of a factory service and/or a factory service services metadata dataset. In this regard, for example, by parsing the system architecture to generate a plurality of services resource consumption representation requests that each include data representative of a subset of the plurality of services and/or the plurality of services metadata datasets, the data representative of the system architecture may be segregated such that it can be processed by a corresponding one of the plurality of services resource consumption utilization tools.

In some embodiments, for example, the system architecture may be parsed such that each of the generated plurality of services resource consumption representation requests are associated with one of a plurality of configurations. In this regard, for example, the system architecture may be parsed such that the data representative of a subset of the plurality of services and/or the plurality of services metadata datasets is arranged in one of the plurality of configurations. For example, the system architecture may be parsed such that the data representative of a first subset of the plurality of services and/or the plurality of services metadata datasets is arranged in a first configuration (e.g., a first services resource consumption representation request is associated with a first configuration) and the data representative of a second subset of the plurality of services and/or the plurality of services metadata datasets is arranged in a second configuration (e.g., a second services resource consumption representation request is associated with a second configuration).

In some embodiments, each of the plurality of services resource consumption utilization tools may only be configured to process a services resource consumption representation request if the services resource consumption representation request is associated with one of the plurality of configurations. In this regard, for example, by parsing the system architecture such that each of the generated plurality of services resource consumption representation requests are associated with one of a plurality of configurations, it may be ensured that each of the plurality of services resource consumption representation requests may be appropriately processed by an associated services resource consumption utilization tool.

As shown in block 606, the computer-implemented method 600 may include processing the plurality of services resource consumption representation requests using a plurality of services resource consumption utilization tools. As shown in block 608, the computer-implemented method 600 may include receiving a plurality of services resource consumption responses from the plurality of services resource consumption utilization tools. As described above, in some embodiments, a plurality of services resource consumption responses may be received from at least some of the plurality of services resource consumption utilization tools. In this regard, for example, a services resource consumption response may be received for each of the generated plurality of services resource consumption representation requests. That is, a services resource consumption representation request may be generated for at least some of the plurality of services resource consumption utilization tools and receive a corresponding services resource consumption response from the at least some of the plurality of services resource consumption utilization tools.

In some embodiments, each of the plurality of services resource consumption responses may include data representative of a preliminary services resource consumption. In this regard, for example, each of the plurality of services resources consumption responses may include data representative of a preliminary services resource consumption associated with the services resource consumption representation request processed by the corresponding services resource consumption utilization tool. Said differently, each of the plurality of services resources consumption responses may include data representative of the preliminary services resource consumption of the subset of the plurality of services associated with the services resource consumption representation request associated with the services resource consumption utilization tool.

In some embodiments, for example, a preliminary services resource consumption may be indicative of an expected lifetime of the subset of the plurality of services. In this regard, the expected lifetime of the subset of the plurality of services may be an amount of time the subset of the plurality of services may operate before having to be replaced. As another example, a preliminary services resource consumption may be indicative of an expected cost of operating the subset of the plurality of services. In this regard, the expected cost of operating the subset of the plurality of services may be, for example, the cost charged by a provider of the subset of the plurality of services. As another example, a preliminary services resource consumption may be indicative of an expected maintenance amount associated with the subset of the plurality of services. In this regard, the expected maintenance amount may be indicative of the amount of resources that must be used to ensure the subset of the plurality of services continuously operate in a normal manner.

In some embodiments, a preliminary services resource consumption may be based at least in part on at least a portion of one or more of the plurality of services metadata datasets. For example, the expected cost of operating the subset of the plurality of services may be based at least in part on services type metadata (e.g., the type of service may impact the expected cost of operating a service). As another example, the expected maintenance amount of operating the subset of the plurality of services may be based at least in part on user type metadata (e.g., the type of user who uses a service may impact an expected maintenance amount associated with the service).

As shown in block 610, the computer-implemented method 600 may include determining a services resource consumption based at least in part on the plurality of services resource consumption responses. In some embodiments, the services resource consumption may be based at least in part on the plurality of services resource consumption responses. In this regard, the services resource consumption may be based at least in part on each of the preliminary services resource consumption. In some embodiments, the services resource consumption may be determined by aggregating the preliminary services resource consumption responses to determine the services resource consumption. In this regard, the services resource consumption may be representative of the plurality of services (e.g., all of the subsets of the plurality of services). For example, the services resource consumption may be indicative of an expected lifetime of the plurality of services. As another example, the services resource consumption may be indicative of an expected cost of operating the plurality of services. As another example, the services resource consumption may be indicative of an expected maintenance amount associated with the subset of the plurality of services.

Additionally or alternatively, the services resource consumption may be based at least in part on the plurality of services metadata datasets (e.g., additionally or alternatively to the plurality of services resource consumption responses). In some embodiments, the services resource consumption may be based at least in part on usage metadata. In this regard, for example, if the usage metadata indicates that one or more of the plurality of services is associated with a high usage, the services resource consumption may indicate that the plurality of services have a low expected lifetime, a high expected maintenance amount, and/or a high expected cost. As another example, if the usage metadata indicates that one or more of the plurality of services is associated with a low usage, the services resource consumption may indicate that the plurality of services have a long expected lifetime, a low expected maintenance amount, and/or a low expected cost.

In some embodiments, the services resource consumption may be based at least in part on computing resource consumption metadata. In this regard, for example, if the computing resource consumption metadata indicates that one or more of the plurality of services is associated with a high computing resource consumption, the services resource consumption may indicate that the plurality of services have a low expected lifetime, a high expected maintenance amount, and/or a high expected cost. As another example, if the usage metadata indicates that one or more of the plurality of services is associated with a low computing resource consumption, the services resource consumption may indicate that the plurality of services have a long expected lifetime, a low expected maintenance amount, and/or a low expected cost.

As shown in block 612, the computer-implemented method 600 may include receiving a historical plurality of system architectures each of the historical plurality of system architectures representative of a historical plurality of services and a historical plurality of services metadata datasets. As described above, in this regard, the system architecture may be parsed to generate the plurality of services resource consumption representation requests using a natural language processing machine learning model. In this regard, for example, the natural language processing machine learning model may be configured to parse the system architecture such that the generated plurality of services resource consumption representation requests each include data representative of a subset of the plurality of services and/or the plurality of services metadata datasets. Said differently, the natural language processing machine learning model may be configured to distinguish between services and services metadata datasets such that a plurality of services resource consumption representation requests may be generated that each include the data representative of the appropriate plurality of services and/or the plurality of services metadata datasets for a corresponding services resource consumption utilization tool.

As shown in block 614, the computer-implemented method 600 may include training the natural language processing machine learning model based at least in part on the historical plurality of system architectures. As described above, in this regard, for example, a historical plurality of system architectures each of the historical plurality of system architectures representative of a historical plurality of services and a historical plurality of services metadata datasets may be received. In this regard, for example, the historical plurality of system architectures may be used to train the natural language processing machine learning model such that the natural language processing machine learning model can appropriately identify and distinguish between services and services metadata datasets.

As shown in block 616, the computer-implemented method 600 may include receiving a historical plurality of non-functional specifications associated with a historical plurality of services. As described above, in this regard, at least a portion of the plurality of services metadata datasets may be generated using a natural language processing machine learning model. In this regard, for example, the natural language processing machine learning model may be configured to parse one or more non-functional specifications associated with the plurality of services (e.g., specifications of the plurality of services). For example, using the natural language processing machine learning model, a non-functional specification associated with a service may be parsed to determine services type metadata.

As shown in block 618, the computer-implemented method 600 may include training the natural language processing machine learning model based at least in part on the historical plurality of non-functional specifications may be received. In this regard, for example, a historical plurality of non-functional specifications associated with a historical plurality of services. In some embodiments, each of the historical plurality of services may be associated with one of the historical plurality of services metadata datasets. In this regard, for example, based on the training using the historical plurality of non-functional specifications associated with the historical plurality of services the natural language processing machine learning model may be used to parse the plurality of non-functional specifications associated with the plurality of services to generate at least a portion of the plurality of services metadata datasets.

As shown in block 620, the computer-implemented method 600 may include causing the system architecture to be generated. As described above, in some embodiments, the system architecture generation tool may be caused to at least in part generate the system architecture. In this regard, for example, the system architecture generation tool may be caused to display an architecture component interface on a user interface. In some embodiments, the architecture component interface may include a plurality of architecture components with each of the plurality of architecture components representative of one of the plurality of services. In this regard, for example, the architecture component interface may include one or more of data lake architecture component, a time series database architecture component, a relational database architecture component, a noSQL database architecture component, a shared file system architecture component, a connection manager architecture component, a queue architecture component, a broker architecture component, a computing instance architecture component, an engine architecture component, an admin architecture component, an agent architecture component, a bucket architecture component, a factory architecture component, a machine learning architecture component, a translation architecture component, a data integration architecture component, an identity provider architecture component, and/or a cloud architecture component.

In some embodiments, causing the system architecture to be generated includes causing the system architecture generation tool to display an architecture modeling interface on a user interface. In some embodiments, the architecture component interface and the architecture modeling interface may be configured to be displayed simultaneously on the user interface. For example, the architecture component interface and the architecture modeling interface may be configured to be displayed side by side on the user interface.

In some embodiments, causing the system architecture to be generated includes generating a plurality of architecture component requests. In some embodiments, each of the plurality of architecture component requests may include an indication of a selection of one of the plurality of architecture components corresponding to one of the plurality of services and one of the plurality of services metadata datasets. Said differently, each of the plurality of architecture component requests may include an indication of one of the plurality of services in the system architecture and a services metadata dataset that corresponds to the one of the plurality of services. In this regard, the plurality of architecture component requests may include an indication of the plurality of services in the system architecture and the plurality of services metadata datasets associated with each of the plurality of services in the system architecture.

In some embodiments, causing the system architecture to be generated includes providing the plurality of architecture component requests to the system architecture generation tool. In some embodiments, causing the system architecture to be generated includes causing the system architecture generation tool to generate an updated architecture modeling interface to be displayed on a user interface based at least in part on the plurality of architecture component requests. In some embodiments, the updated architecture modeling interface may include the system architecture (e.g., example system architecture displays the plurality of services in the system architecture and the each of the plurality of services metadata datasets associated with each of the plurality of services). In this regard, the updated architecture modeling interface may be configured to display the generated system architecture.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure.

Use of broader terms such as "comprises," "includes," and "having" should be understood to provide support for narrower terms such as "consisting of," "consisting essentially of," and "comprised substantially of" Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

That which is claimed:

1. A computer-implemented method comprising:
receiving a system architecture, wherein the system architecture is representative of a plurality of services and a plurality of services metadata datasets, wherein each of the plurality of services is associated with one of the plurality of services metadata datasets;
parsing the system architecture to generate a plurality of services resource consumption representation requests;
processing the plurality of services resource consumption representation requests using a plurality of services resource consumption utilization tools;
receiving a plurality of services resource consumption responses from the plurality of services resource consumption utilization tools;
determining a services resource consumption based at least in part on the plurality of services resource consumption responses; and
wherein the computer-implemented method further comprising:
causing, via a user interface, generation and display of the system architecture by:
displaying an architecture component interface comprising a plurality of architecture components each representative of the plurality of services;
displaying an architecture modeling interface;
generating a plurality of architecture component requests, each comprising an indication of a selection of one of the plurality of architecture components corresponding to one of the plurality of services and one of the plurality of services metadata datasets;
providing the plurality of architecture component requests to a system architecture generation tool; and
displaying an updated architecture modeling interface comprising the system architecture, based at least in part on the plurality of architecture component requests.

2. The computer-implemented method of claim 1, wherein parsing the system architecture to generate the plurality of services resource consumption representation requests is performed by a natural language processing machine learning model.

3. The computer-implemented method of claim 2, further comprising:
receiving a historical plurality of system architectures each of the historical plurality of system architectures representative of a historical plurality of services and a historical plurality of services metadata datasets, wherein each of the historical plurality of services is associated with one of the historical plurality of services metadata datasets; and
training the natural language processing machine learning model based at least in part on the historical plurality of system architectures.

4. The computer-implemented method of claim 1, wherein at least a portion of the plurality of services metadata datasets is generated by a natural language processing machine learning model parsing a plurality of non-functional specifications associated with the plurality of services.

5. The computer-implemented method of claim 4, further comprising:
receiving a historical plurality of non-functional specifications associated with a historical plurality of services; and
training the natural language processing machine learning model based at least in part on the historical plurality of non-functional specifications.

6. The computer-implemented method of claim 1, wherein a first service of the plurality of services is associated with a first services resource consumption utilization tool of the plurality of services resource consumption utilization tools and a second service of the plurality of services is associated with a second services resource consumption utilization tool of the plurality of services resource consumption utilization tools.

7. The computer-implemented method of claim 1, wherein each of the plurality of services resource consumption representation requests are associated with one of a plurality of configurations.

8. The computer-implemented method of claim 1, wherein each of the plurality of services metadata datasets comprises one or more of a computing resource consumption metadata, services type metadata, usage metadata, user type metadata, regional deployment infrastructure metadata, or user identification metadata.

9. The computer-implemented method of claim 1, wherein the system architecture is representative of a computing system comprising a plurality of services and a plurality of connections between the plurality of services.

10. An apparatus comprising at least one processor and at least one memory coupled to the at least one processor, wherein the at least one processor is configured to:
receive a system architecture, wherein the system architecture is representative of a plurality of services and a plurality of services metadata datasets, wherein each of the plurality of services is associated with one of the plurality of services metadata datasets;
parse the system architecture to generate a plurality of services resource consumption representation requests;
process the plurality of services resource consumption representation requests using a plurality of services resource consumption utilization tools;
receive a plurality of services resource consumption responses from the plurality of services resource consumption utilization tools;
determine a services resource consumption based at least in part on the plurality of services resource consumption responses; and
wherein the at least one processor is further configured to:
cause, via a user interface, generation and display of the system architecture by:
displaying an architecture component interface comprising a plurality of architecture components each representative of the plurality of services;
displaying an architecture modeling interface;
generating a plurality of architecture component requests, each comprising an indication of a selection of one of the plurality of architecture components corresponding to one of the plurality of services and one of the plurality of services metadata datasets;
providing the plurality of architecture component requests to a system architecture generation tool; and displaying an updated architecture modeling interface comprising the system architecture, based at least in part on the plurality of architecture component requests.

11. The apparatus of claim 10, wherein parsing the system architecture to generate the plurality of services resource consumption representation requests is performed by a natural language processing machine learning model.

12. The apparatus of claim 11, wherein the at least one processor is configured to:
   receive a historical plurality of system architectures each of the historical plurality of system architectures representative of a historical plurality of services and a historical plurality of services metadata datasets, wherein each of the historical plurality of services is associated with one of the historical plurality of services metadata datasets; and
   train the natural language processing machine learning model based at least in part on the historical plurality of system architectures.

13. The apparatus of claim 10, wherein at least a portion of the plurality of services metadata datasets is generated by a natural language processing machine learning model parsing a plurality of non-functional specifications associated with the plurality of services.

14. The apparatus of claim 13, wherein the at least one processor is configured to:
   receive a historical plurality of non-functional specifications associated with a historical plurality of services; and
   train the natural language processing machine learning model based at least in part on the historical plurality of non-functional specifications.

15. The apparatus of claim 10, wherein a first service of the plurality of services is associated with a first services resource consumption utilization tool of the plurality of services resource consumption utilization tools and a second service of the plurality of services is associated with a second services resource consumption utilization tool of the plurality of services resource consumption utilization tools.

16. The apparatus of claim 10, wherein each of the plurality of services resource consumption representation requests are associated with one of a plurality of configurations.

17. The apparatus of claim 10, wherein each of the plurality of services metadata datasets comprises one or more of a computing resource consumption metadata, services type metadata, usage metadata, user type metadata, regional deployment infrastructure metadata, or user identification metadata.

18. A non-transitory computer-readable storage medium comprising computer program code for execution by one or more processors of a device, the computer program code configured to, when executed by the one or more processors, cause the device to:
   receive a system architecture, wherein the system architecture is representative of a plurality of services and a plurality of services metadata datasets, wherein each of the plurality of services is associated with one of the plurality of services metadata datasets;
   parse the system architecture to generate a plurality of services resource consumption representation requests;
   process the plurality of services resource consumption representation requests using a plurality of services resource consumption utilization tools;
   receive a plurality of services resource consumption responses from the plurality of services resource consumption utilization tools;
   determine a services resource consumption based at least in part on the plurality of services resource consumption responses; and
   the computer program code is further configured to, when executed by the one or more processors, further cause the device to:
   cause, via a user interface, generation and display of the system architecture by:
      display an architecture component interface comprising a plurality of architecture components each representative of the plurality of services;
      display an architecture modeling interface;
      generate a plurality of architecture component requests, each comprising an indication of a selection of one of the plurality of architecture components corresponding to one of the plurality of services and one of the plurality of services metadata datasets;
      provide the plurality of architecture component requests to a system architecture generation tool; and
      display an updated architecture modeling interface comprising the system architecture, based at least in part on the plurality of architecture component requests.

* * * * *